United States Patent [19]

Robishaw et al.

[11] Patent Number: 4,610,215
[45] Date of Patent: Sep. 9, 1986

[54] CONSTRUCTION COMPONENTS WITH IMPROVED LOCKING SYSTEM

[76] Inventors: Alces P. Robishaw, 9333 Memorial #210, Houston, Tex. 77024; Paul A. Robishaw, 10122 Meadow Lake La., Houston, Tex. 77042

[21] Appl. No.: 642,181

[22] Filed: Aug. 17, 1984

[51] Int. Cl.$^4$ ............................................. B63B 35/38
[52] U.S. Cl. .................................... 114/249; 114/266; 114/77 R; 403/318
[58] Field of Search .................... 114/26, 30, 28, 46, 114/77 A, 77 R, 249, 266, 267, 252; 403/316, 1, 318, 324, 327

[56] References Cited

U.S. PATENT DOCUMENTS

| | | | |
|---|---|---|---|
| 2,876,726 | 3/1959 | Robishaw | 114/266 |
| 3,057,315 | 10/1962 | Robishaw | 114/266 |
| 3,430,601 | 3/1969 | Thompson | 114/249 |
| 3,614,938 | 11/1969 | Statile | 114/249 |
| 3,799,100 | 3/1974 | Marriner | 114/249 |
| 3,805,721 | 4/1974 | Robishaw | 114/266 |
| 3,818,854 | 6/1974 | Marriner | 114/249 |
| 3,822,667 | 7/1974 | Marriner | 114/249 |
| 3,938,461 | 2/1976 | Marriner | 114/230 |
| 4,290,382 | 9/1981 | Conti | 114/266 |

FOREIGN PATENT DOCUMENTS

| | | | |
|---|---|---|---|
| 2651247 | 5/1978 | Fed. Rep. of Germany | 114/266 |
| 2725060 | 12/1983 | Fed. Rep. of Germany | 114/266 |

Primary Examiner—Trygve M. Blix
Assistant Examiner—Edwin L. Swinehart
Attorney, Agent, or Firm—Browning, Bushman, Zamecki & Anderson

[57] ABSTRACT

A construction component has a plurality of male and female lock assemblies for engagement with female and male lock assemblies of a similar construction component for locking the two components together. The male lock assemblies are arranged in vertical tandem pairs, as are the female lock assemblies. Each of the male lock assemblies includes a rigid pin which is reciprocable with respect to the component between an advanced position and a retracted position. Each female lock assembly defines a socket opening and includes a transversely reciprocable lock for locking a pin in the socket opening. The male lock assembly includes a similar transversely reciprocable lock adapted to lock the pin in at least one of, and preferably both of, its two positions. The locks of each tandem pair of assemblies are connected for joint movement and are adapted so that, when lowered, the lower lock engages its respective pin before the upper lock engages its pin. The structural component is in the form of a rectangular parallelepiped with gross dimensions corresponding to those of a standard freight container. All parts of the lock assemblies are retained against separation and are designed to lie generally within such gross dimensions, so as not to interfere with handling of the construction component in the manner of a standard freight container.

33 Claims, 10 Drawing Figures

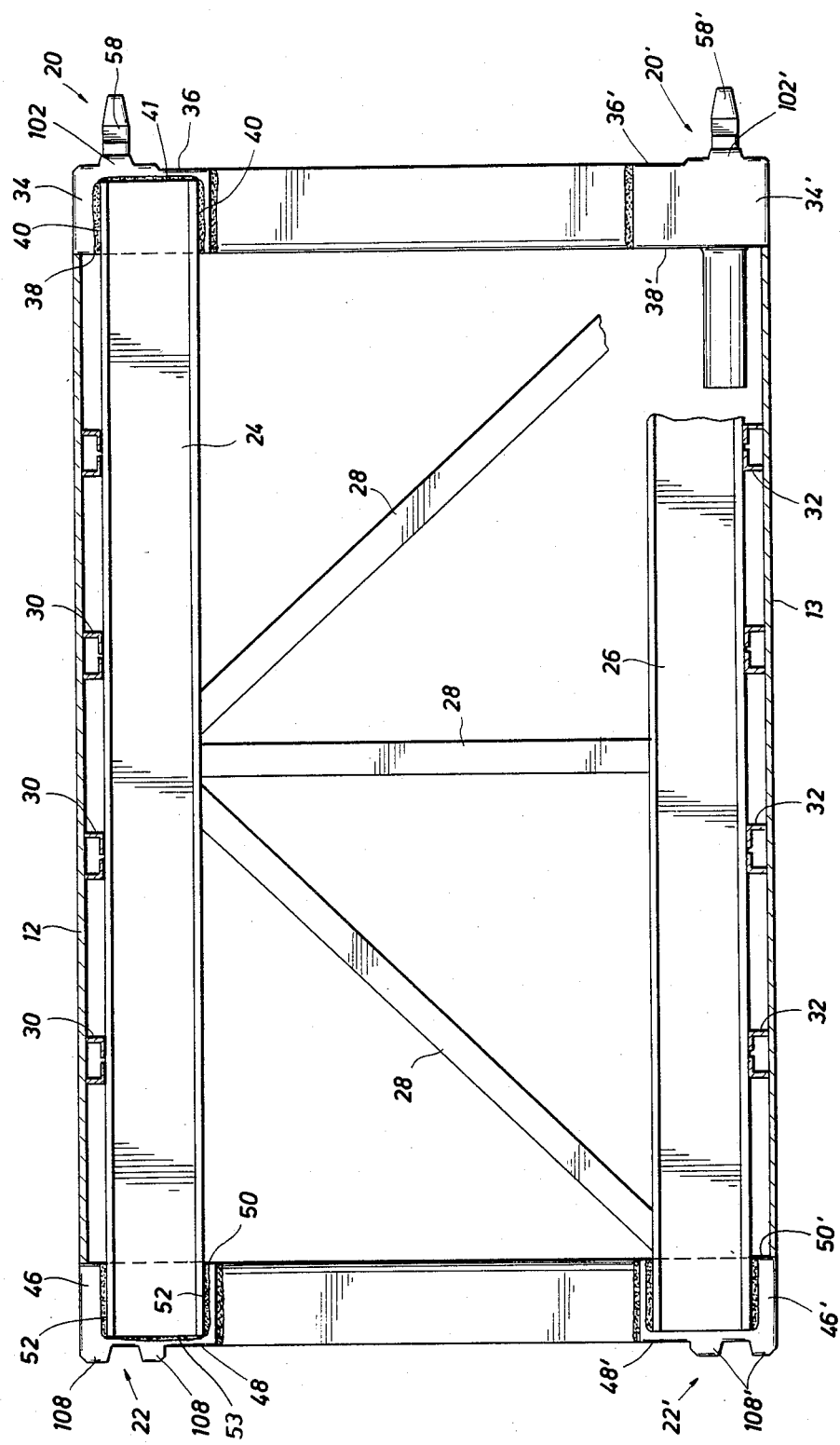

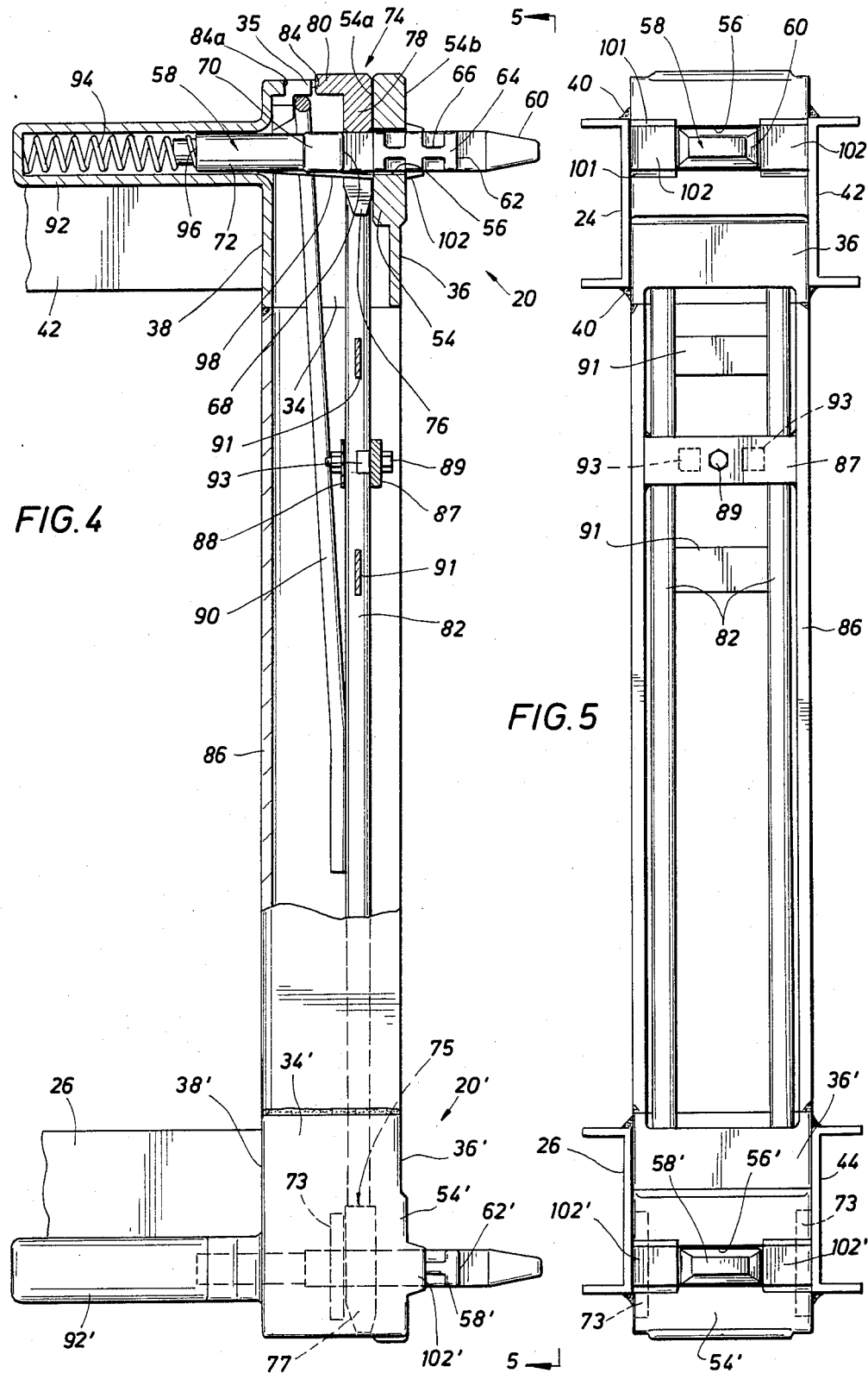

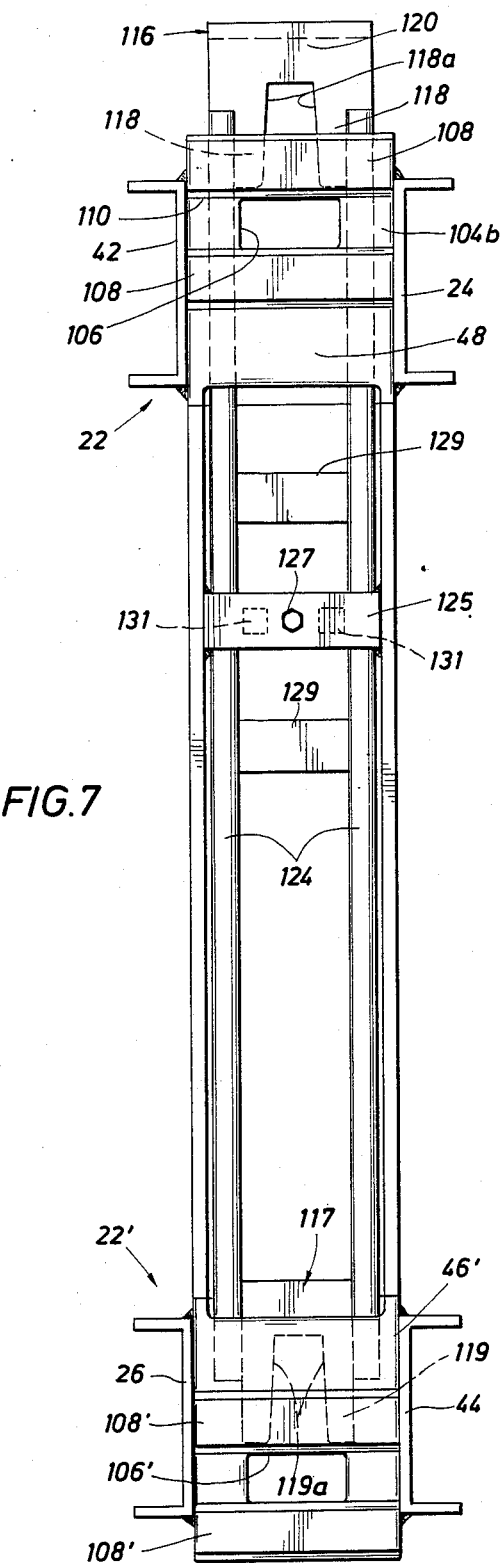
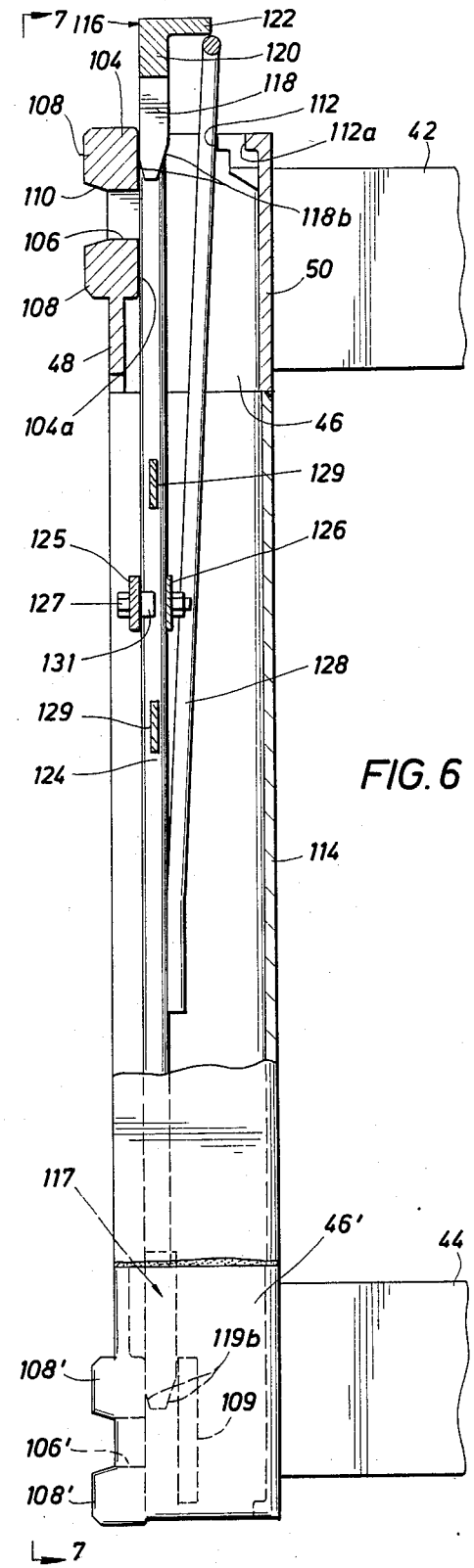

CONSTRUCTION COMPONENTS WITH IMPROVED LOCKING SYSTEM

BACKGROUND OF THE INVENTION

The present invention pertains to construction components which may be locked together in various configurations to form structures such as bridges, platforms, and the like. Prior U.S. Pat. No. 2,876,726, U.S. Pat. No. 3,057,315, and U.S. Pat. No. 3,805,721 describe a series of successive developments in such construction components and special locks therefor. The present invention provides further improvements in such construction components. However, while the inventions of said prior patents are described in the context of buoyant construction components, such as are used to form barges, floating platforms, floating bridges, and the like, it is contemplated that the present invention may be applied not only to such buoyant components but also to components for forming non-floating structures such as earth supported bridges, earth supported platforms, etc.

In modern international commerce, there is widespread use of what are termed "standard freight containers." Such a container is generally in the form of a rectangular parallelepiped. It not only has standardized external dimensions, but in addition, usually includes a standard form of fitting which may be engaged by standardized tools and the like for both lifting and moving the container, and for lashing it in place in various locations. Freight handling facilities, e.g. at seaports, throughout the world, have been equipped with such standardized lifting and moving equipment, whereas freight vehicles, such as ships, have been equipped with standard sized racks used in aligning and retaining such containers. Such standardization, on an international scale, has vastly facilitated the shipping and handling of many types of freight which can be packed in the containers.

Coinciding with the above developments in freight handling equipment and practices, is the need for transporting construction components of the type generally exemplified by the aforementioned prior U.S. patents to the locations at which they will be used. Such transport could be greatly facilitated and the cost thereof reduced if the construction components could be handled and shipped in the same manner as standard freight containers.

The generally rectangular parallelepiped configuration of such components would readily lend itself to such handling, but problems are presented by the fact that the lock assemblies carried by the components include protruding pin members. Thus, for example, if the gross dimensions of such a component, measured between the outer surfaces of its walls, were sized to correspond to those of a standard freight container, the pins of the lock assemblies would protrude beyond such standardized profile or gross dimensions, and thereby prevent the component from being placed in the standardized racks typically provided on freighters. On the other hand, if the construction component were sized so that its dimensions, measured to the outer ends of the lock pins, would correspond to those of a standard freight container, the gross dimensions, measured between the outer surfaces of the walls, would then be too small to enable the component to be properly held in such racks.

Furthermore, even if the components are not to be handled or shipped as standard freight containers, it would be preferable to eliminate the protruding pins in any transport or storage situation, not only for the most economic use of space, but also for the protection of the pins themselves and other structures, apparatus, or even personnel which the pins might strike in the course of handling.

Another area for potential improvement revolves around the fact that, when such construction components are locked together to form a given structure, many different types of loads may be imposed thereon. For example, where the components are assembled to form a floating structure, one of the greatest forces is a vertical shear-type force exerted by virtue of the fact that one component tends to rise or fall with respect to another due, for example, to wave action and/or to the passage of motor vehicles from one component to the next across the upper surface of the overall structure. Another significant type of force is a horizontally directed tensile force exerted by virtue of the tendency of the connected components to separate. There are also transverse horizontal shear-type forces, which generally represent a somewhat less serious problem than the transverse vertical shear forces.

In the structures disclosed in the aforementioned prior U.S. patents, when two components are locked together, the transfer of all of these various forces from one component to the next involves the pin members of the male lock assemblies. Thus, the dimensions of these pin members are a limiting factor on the magnitude of forces which can be handled. The ramifications of this limitation in turn include not only limits on the uses to which such components can be put, but also limits on the size of the components themselves, given a specific pin size.

Yet another area for potential improvement relates to the fact that, in many situations, it is desirable, or even necessary, that the workers who assemble the construction components to form a completed structure stand on those very comonents as they are being connected together. When the components are buoyant, and are connected together while floating on a body of water, the proglems are further complicated. Thus, it is extremely important that the lock systems be easy to use, requiring only a few simple motions with simple hand tools. In general, the aforementioned U.S. Pat. No. 2,876,726, U.S. Pat. No. 3,057,315, and U.S. Pat. No. 3,805,721 meet these needs quite well. However, when the workers stand, as they naturally would, near the component wall at which the connections are to be made, and if the components are floating, then the components tend to rock or tip downwardly at said adjacent walls, which tends to splay the lower edges of said walls making it difficult to mate the connectors along said lower edges.

There have been attempts to address the various problems discussed above, but they have not been completely satisfactory. In particular, there have been suggestions that pontoons or the like could be sized to generally correspond to standard freight containers. These devices have been designed with locks substantially different from the type described and illustrated in the aforementioned prior U.S. patents.

German Patent Publications No. 2725060 and No. 2651247 are exemplary. The lock structures illustrated therein do not employ horizontally extending pin members carried by the components to be connected.

Rather, the components must be brought together so that recesses in the two components are properly aligned, and then a separate pin member is inserted into the aligned recesses in a vertical directional mode, the pin member and recesses being configured so as to effect connection of the two components.

This system suffers from several disadvantages. First, in what may have been an effort to devise a locking arrangement which would not include parts protruding substantially beyond the gross dimensions of the structural component, a form of locking system has been chosen which differs substantially from the type of lock generally described and illustrated in prior U.S. Pat. No. 2,876,726, U.S. Pat. No. 3,057,315 and U.S. Pat. No. 3,805,721. This is undesirable because the general type of lock disclosed in said prior U.S. patents has proven, over many years of use, to be particularly effective, reliable, easy to use, and otherwise highly successful in the connection of construction components, particularly for floating structures, for which use this last-mentioned locking scheme was specially developed. It is undesirable to sacrifice these proven and highly successful features of the locks exemplified by the prior U.S. patents by going to the less effecting locking scheme exemplified by the aforementioned German patent publications.

Another problem with the type of structure exemplified by the German patent publications is that the locking system requires a completely separate insertable pin member. These pin members must be separately carried and stored, and therefore they are susceptible to being lost, misappropriated by workers for use as make-shift tools, or otherwise disposed of so that, when the time comes to connect the structural components to form a structure, the pin members either cannot be located, or have been damaged.

Still another problem with this type of prior art scheme is that, due to the elimination of any part which extends a substantial distance horizontally from the side walls of the construction component, there is no effective structural guidance for bringing two such components into proper alignment, and maintaining them so aligned, so that the pin member can be inserted into the aligned recesses in order to complete the lock. This can be a particular problem when it is necessary to connect such components while they are floating on a body of water.

In some instances, structures somewhat similar to those disclosed in the German patent publications have further been provided with mating lugs and recesses projecting and receiving in a generally horizontal direction, but by a distance small enough not to interfere with the handling of the structural component in the manner of a standard freight container. Because of this very limited horizontal extent, these lugs and recesses do not really provide a great deal of assistance with the alignment problem described above. In short, the components must be fairly closely aligned before the lugs and recesses can be engaged. It is believed that such lugs and recesses probably were not provided primarily to serve as guides in aligning the components, but rather, may have been provided to bear the shear loads between the components, since the vertically arranged pin and recess scheme does not include any means for doing so.

Still another scheme for connecting pontoons is disclosed, in various embodiments, in the following U.S. patents: U.S. Pat. No. 3,799,100; U.S. Pat. No. No. 3,818,854; U.S. Pat. No. 3,822,667; U.S. Pat. No. 3,938,461; and U.S. Pat. No. 4,290,382. The last-mentioned patent generally corresponds to at least one known commercial embodiment of such scheme. One of the main features of this scheme is that it is specifically designed to provide a hinging-type action or articulation between the connected pontoons about a horizontal axis. All of the connectors on a given side of the pontoon are horizontally aligned on the same level. Furthermore, as best shown in the first four patents listed above, the pin members of the locks have flexible elastomeric sections bridging gaps between adjacent pontoons to allow for such articulation. The last listed patent, U.S. Pat. No. 4,290,382, further discloses the provision of separate shear bearing formations. These formations define generally cylindrical shear bearing surfaces, with the axes of the cylinders disposed horizontally and aligned with the pin-type connectors so as to form large hinges.

This type of connection scheme, and the hinging action specifically provided thereby, are unacceptable in construction components for forming such structures as bridges, drilling platforms, etc. Furthermore, the connectors are so large and unwieldly that they cannot be manually moved, even with hand tools, but rather, require the use of large, heavy duty power tools such as motorized winches. Likewise, the extremely large connector elements, e.g. the shear bearing formations which protrude substantially from the sides of the pontoons, effectively eliminate the possibility of sizing and handling the pontoons as standard freight containers.

SUMMARY OF THE INVENTION

The present invention utilizes many general principles of lock systems disclosed in prior U.S. Pat. No. 2,876,726, U.S. Pat. No. 3,057,315, and U.S. Pat. No. 3,805,721, with their proven advantages and success in connecting construction components, buoyant or otherwise, but with further improvements which address the various problems discussed above in connection with the prior art.

A construction component of the present invention has thereon a plurality of male and female lock assemblies, generally similar to the lock assemblies disclosed in the aforementioned prior U.S. patents, adapted for engagement with respective female and male lock assemblies of a similar construction component for locking the two components together. One of the main differences between the locking system of the present invention and those of the aforementioned prior U.S. patents is that, in each of the male lock assemblies, the generally horizontally disposed pin member is reciprocable with respect to the construction component between an advanced position in which it protrudes significantly from a lateral wall of that component and a retracted position in which it lies generally within the gross dimensions of the component (i.e. in which it does not protrude from the component by a distance sufficient to interfere with its handling in the manner of a standard freight container). Accordingly, the gross dimensions of the component may be chosen to generally correspond to those of a standard freight container.

Thus, for shipping and handling, the pin members may be disposed in their retracted positions, and the component on which they are carried may further be provided with standard container fittings whereby the container may be lifted, lashed, and otherwise handled in generally the same manner as such freight containers.

However, when the construction component has been unloaded at the construction site, the pin members may be placed in their advanced positions, extending substantially outwardly from the side walls of the component, whereby tapered surfaces on the pin members and/or the sockets of the mating female assemblies of another component to be connected may gradually guide the components into a properly aligned position and aid in temporarily maintaining such position, as explained more fully in the aforementioned U.S. patents.

The male lock assemblies of each construction component are arranged in tandem pairs, the two male lock assemblies of each such pair being vertically spaced from each other along a lateral wall of the construction component. The female lock assemblies are similarly arranged in tandem vertical pairs. Furthermore, the pin members of the male lock assemblies are rigid. Thus, the present invention is designed to specifically prevent any substantial hinging action between adjacent connected construction components. Nevertheless, the pin members and other movable parts may be made sufficiently small so as to be manually movable with simple hand tools.

Each of the female lock assemblies includes a female body comprising a female socket means defining a female socket opening adapted for receipt of such a pin member. Further, the female lock assembly includes lock means movable generally transverse to the socket opening between a release position and a locking position for selectively locking the pin member in the female socket means. The male lock assembly, in turn, likewise comprises a lock means similar to that of the female lock assembly which is movable generally transverse to the pin member between a release position and a locking position for selectively locking the pin member in at least one of, but preferably either of, its two positions.

More particularly, the pin member has a head end, a tail end, and two lock engagement regions located between the ends and also spaced from each other along the length of the pin member. The male lock assembly further includes a male body comprising male socket means having front and rear faces and defining a male socket opening extending therethrough in the front-rear directional mode. The pin member is received in this male socket opening for reciprocation relative to the male socket means between its advanced and retracted positions.

When the pin member is in its advanced position, one of its lock engagement region is disposed forward of the front face of the male socket means by a distance such that, if the pin member is inserted into the socket opening of a female lock assembly of another construction component, this first lock engagement region will be properly positioned for engagement by the lock means of the female lock assembly. At the same time, with the pin member in its advanced position, the second of the lock engagement regions is located behind the rear face of the male socket means so that it is in proper position for engagement by the male lock means for locking the pin member in its advanced position and also transferring rear-to-front loads imposed on the pin member to the male body on which it is carried. When the pin member is in its retracted position, the first lock engagement region thereof is disposed behind the rear face of the male socket means in a position analogous to that of the second lock engagement region when the pin member is in its advanced position. Thus, in the retracted position, the first lock engagement region may be engaged by the male lock means to retain the pin member in the retracted position.

It can thus be seen that the locking system of the present invention provides a scheme which allows the profile of the lock assemblies to be reduced so as not to interfere with shipping and handling of the construction component on which they are carried in the manner of a standard freight container. Nevertheless, after such shipping and handling, substantially horizontally extending pin members may be advanced to provide all of the advantages of the types of lock assemblies generally disclosed in prior U.S. Pat. No. 2,876,726, U.S. Pat. No. 3,057,315, and U.S. Pat. No. 3,805,721.

Furthermore, there are no separate parts which must be separately carried, and therefore could be lost. Rather, the lock assemblies of the present invention are completely self-contained. More particularly, the reciprocable pin members of the male lock assemblies, as well as the reciprocable lock means of both the male and female lock assemblies, are carried on those lock assemblies, and retained against separation therefrom. In addition, the means are provided for so retaining the male and female lock means in raised positions against the force of gravity. This represents a considerable advantage over various other types of prior art locking schemes as described more fully above.

The bodies of the male and female lock assemblies, which include their respective socket means, may also include integral shear bearing formations, projecting and receiving in a generally horizontal directional mode for interengagement when the male and female lock assemblies are mated and locked, so as to transfer shear loads between the connected assemblies independently of the respective pin member. The extent of horizontal projection of any such shear bearing formation need not be so great as to interfere with the aforementioned handling of the construction component in the manner of a standard freight container. Furthermore, although the rigidity of the pin members, and the arrangement of the lock assemblies in vertical tandem pairs prevents hinging action as mentioned hereinabove, the shear bearing formations are preferably configured to further positively resist any such hinging action about a horizontal axis.

By relieving the pin member from shear loading in at least one transverse direction, e.g. vertical, it is possible to make the vertical transverse dimension of the pin member, in the area adjacent the socket means when the pin is advanced and locked into a female assembly, significantly smaller than its transverse horizontal direction. This in turn makes it possible to maximize the distance between the centers of gravity of two tandem pins, thereby increasing the resistance to hinging action. From another point of view, it is possible to substantially increase the transverse horizontal dimension of the pin, to increase its tensile and horizontal shear bearing capacity, without a corresponding increase in transverse vertical dimension. Thus, without an unduly large or heavy pin, larger and heavier construction components may be used, and the manner in which the components are used may be expanded.

Unlike the prior art exemplified by the German patent publications, however, the present invention still makes use of a horizontally extending pin in the male lock assembly and a corresponding socket in the female lock assembly. Therefore, when the pin member is inserted into the female socket, these structures may temporarily bear the vertical shear loads while the lock means are being moved to their locking positions. Again, this represents a tremendous advantage in terms of the ease of assembling the components in actual practice, particularly when the components must be assembled while floating on water.

Even if the components on which the lock assemblies are carried are not sized to correspond generally to standard freight containers, the retractability of the pins of the male lock assemblies is highly desirable, since it makes the lock assemblies, and the components in general, much easier and safer both to handle and store in virtually any situation.

The lock means of each tandem pair of lock assemblies are preferably connected for joint vertical movement. This permits the lower of the two lock assemblies to be operated along with the upper assembly by workers standing on the upper decks of the construction components. To aid in solving the problem of tipping or rocking of the construction components by such workers standing close to the lateral walls on which the lock assemblies are being used, resulting in splaying of the lower ends of those walls, the female lock means of a tandem pair of female lock assemblies are designed so that the lower of the two lock means will engage a pin member inserted in the respective female socket before the upper lock means will engage a like related pin when the two lock means are driven downwardly in unison. The male lock means are similarly designed, but for a different purpose. Specifically, when it is desired to place the pin members of a tandem pair of male lock assemblies in their retracted positions, and lock them in such positions, the lower pin member can be forced inwardly to its retracted position, the tandem lock means can be jointly lowered until said lower pin is engaged, the upper pin can then be forced to its retracted position, and the lock means can be further lowered to completely engage and lock both pins in their retracted positions. This eliminates the need to manually hold both pins in their retracted positions while the lock means are being lowered.

Accordingly, it is an object of the present invention to provide an improved construction component including vertical tandem pairs of male lock assemblies having retractable rigid pin members.

Another object of the present invention is to provide such a component whose gross dimensions generally correspond to those of a standard freight container.

Another object of the present invention is to provide such a construction component which is buoyant.

Still other objects, features, and advantages of the present invention will be made apparent by the following detailed description, the drawings, and the claims.

BRIEF DESCRIPTION OF THE DRAWINGS

FIG. 3 is a transverse view through the construction component of FIG. 1 taken along the line 3—3 of FIG. 1.

FIG. 4 is a side view, partly in cross section and partly in elevation, of a pair of tandem male lock assemblies.

FIG. 5 is a front view of the tandem male lock assemblies, taken generally on the line 5—5 of FIG. 4.

FIG. 6 is a view, similar to that of FIG. 4, showing a pair of tandem female lock assemblies.

FIG. 7 is a view of the tandem female lock assemblies similar to that of FIG. 5 and taken generally on the line 7—7 of FIG. 6.

DETAILED DESCRIPTION OF THE PREFERRED EMBODIMENT

Figure 1:
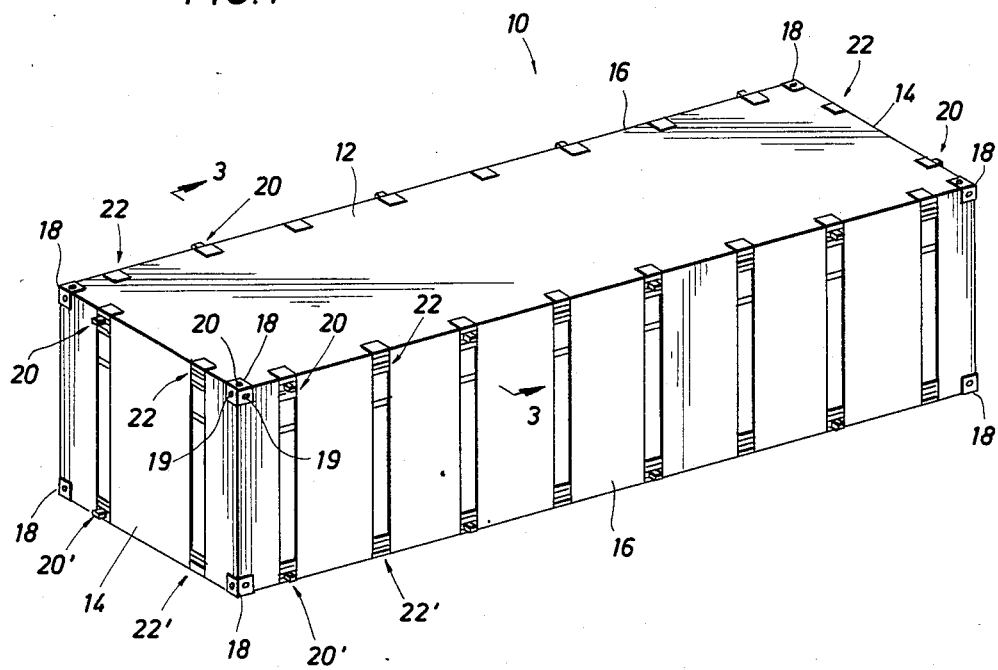
FIG. 1 is a perspective view of a construction component incorporating the present invention.

FIG. 1 represents a construction component 10 incorporating various features of the present invention. These features represent improvements in the apparatus described and illustrated in prior U.S. Pat. No. 2,876,726, U.S. Pat. No. 3,057,315, and U.S. Pat. No. 3,805,721. Such improvements will be described in detail hereinafter. Otherwise, the component 10 and the lock assemblies carried thereby may be assumed to incorporate the various features disclosed in said prior U.S. patents. Accordingly, U.S. Pat. No. 2,876,726, U.S. Pat. No. 3,057,315, and U.S. Pat. No. 3,805,721 are hereby expressly incorporated herein by reference.

The construction component 10, as shown, is a buoyant type, so that it may be used in constructing floating bridges, barges, floating piers or docks, floating platforms, and the like. It will be appreciated, however, that the component 10, along with similar components, could likewise be used in the construction of various non-floating structures, such as land supported bridges, platforms, etc. Construction components specifically intended for the latter type usage may or may not be made buoyant, as desired.

More specifically, component 10 is in the form of a rectangular parallelepiped. Component 10 includes an internal force bearing framework, to be described hereinafter, which is generally encased within an outer covering including an upper wall 12, a lower wall 13, and four lateral walls. The lateral walls in turn are subdivided into end walls 14 and side walls 16.

In each corner of the component 10, there is mounted a standard container fitting 18. Such fittings are well known, and in particular, are of the same type which are used in the corners of standard freight containers. Each of the fittings 18 has three intersecting bores 19 into which lifting tools, lash lines and the like can be inserted for lifting and handling the component 10, lashing it in place in racks on a freighter, and otherwise handling the component 10 in the same manner as standard freight containers are handled.

The gross dimensions of component 10, measured between the outer surfaces of its various pairs of opposite walls, generally correspond to those of a standard freight container. For example, the gross dimensions of component 10 may correspond to those of any of the standard size containers listed in the leaflet "ISO Container Dimensions" filed herewith and hereby expressly incorporated by reference. However, it is contemplated that the present invention could be adapted to other container sizes which may become standard in the future.

When it is said that the gross dimensions of component 10 "generally" correspond to those of a standard freight container, it is meant that any projections formed by the container fittings 18 or the various parts of the lock assemblies to be described hereinafter, when those lock assemblies are placed in suitable positions for transport, do not project beyond the outer surfaces of the walls of component 10 by distances such as to interfere with the shipping and handling of component 10 in generally the same manner as a standard freight container.

A plurality of upper and lower male lock assemblies 20 and 20', respectively, and upper and lower female lock assemblies 22 and 22', respectively, are carried adjacent the upper and lower edges of the lateral walls, i.e. end walls 14 and side walls 16. The lock assemblies are arranged in tandem pairs, the assemblies of each pair being vertically spaced so that they are disposed respectively adjacent the upper and lower edges of the particular lateral wall on which they are located. The terms "vertical" and "horizontal" are used herein for convenience; they refer to the apparatus as shown and as normally used, and should not be construed as further limiting the scope. The assemblies of each pair are of the same gender, and the male and female assemblies are alternated along the length of each lateral wall, and are of an even number. Thus, on each end wall 14 there are two pairs of assemblies, one pair of male assemblies 20 and 20' and one pair of female assemblies 22 and 22'.

Furthermore, the male assemblies 20 and 20' on one of the end walls 14 are disposed across from and aligned with the female assemblies 22 and 22' of the other of the end walls 14. Thus, as may be seen in FIG. 2, one end of a component 10 can be aligned with either end of another similar component 10, and the male assemblies of each of said ends will automatically be aligned with the female assemblies of the other of said ends so that the two can be connected. Similarly, there are eight pair of lock assemblies, alternately male and female, arranged along the length of each of the side walls 16, and each male assembly on one side of the construction component is located across from a female assembly on the other side. Thus, a given side of a component 10 can be connected to either side of another similar component 10.

Figure 2:
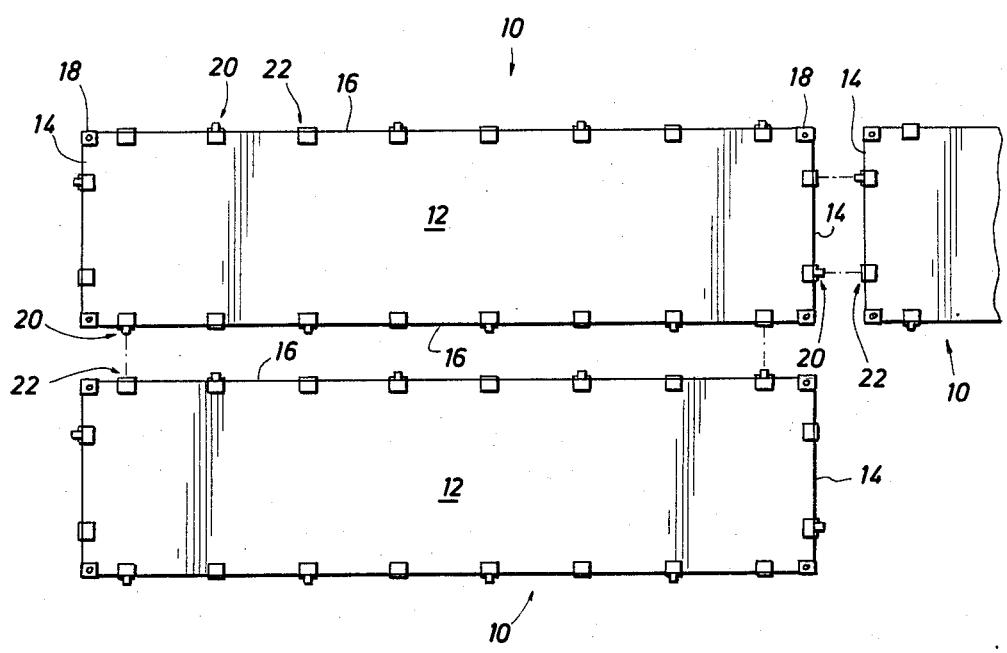
FIG. 2 is a top plan view of several construction components, of the type illustrated in FIG. 1, positioned for prospective connection in one of several possible configurations.

This differs from the arrangements disclosed in said prior U.S. Pat. No. 2,876,726, U.S. Pat. No. 3,057,315, and U.S. Pat. No. 3,805,721, wherein all of the assemblies on any given side of the device were of the same gender, and consequently, a given end or side of one component could only be connected to one end or one side of a similar component. Of course, it will be appreciated that FIG. 2 illustrates only one, and that a relatively simple one, of the many configurations in which such components can be connected. It will be noted, in particular, that among the variations are those in which components are connected end-to-side and those in which they are connected side-to-side, but in an offset or staggered manner.

As previously mentioned, the construction component 10 includes an internal structural framework which, as more fully described in the aforementioned prior U.S. patents, may include a plurality of interconnected trusses. An exemplary truss, and more specifically a transverse truss extending from side-to-side within component 10, is shown in FIG. 3. As mentioned, each tandem pair of male assemblies on one side of the construction component is located across from a tandem pair of female assemblies on the other side of the component.

As shown in FIG. 3, such complementary pairs of male and female lock assemblies are mounted at opposite ends of a given transverse truss. The truss shown in FIG. 3 includes parallel upper and lower cords 24 and 26, interconnected by struts 28. As fully explained in prior U.S. Pat. No. 3,057,315, struts 28 are arranged so as to abut cords 24 and 26 at spaced apart locations, so as to enhance the flexibility of the truss. Similarly, rails 30, which space upper wall 12 from the upper extremity of cord 24 and similar cords in other trusses throughout the construction component, abut cord 24 at positions spaced longitudinally from those at which the trusses 28 abut cord 24. Likewise, rails 32 which are disposed between the bottom of lower cord 26 and the bottom wall 13 of the construction component are longitudinally spaced from the locations of abutment of struts 28 with cord 26.

Referring now jointly to FIGS. 3, 4 and 5, each of the male lock assemblies 20 and 20' of the tandem pair shown includes a body in the form of a housing 34 or 34', respectively. Housing 34 will be described in greater detail hereinafter. Housings 34 and 34' are identical, but reversed in orientation so that they are mirror images across a horizontal plane. At this point, it is further noted, that any part of lower male lock assembly 20' which is identical to a part of upper male lock assembly 20 will be designated by the same reference numeral with the character "'" appended thereto. To the extent that the upper and lower male lock assemblies are identical, the lower assembly will not be described in great detail. The same scheme will be utilized in describing upper and lower female lock assemblies 22 and 22'.

Housing 34 has a front wall 36 located near the outer end of the truss in position for general alignment with the respective side wall 16, and a rear wall 38 spaced therefrom inwardly with respect to the truss. Cord 24 is channel-shaped and is welded to one side of the housing 34 of the upper male lock assembly 20 of the tandem pair. Cord 24 is oriented so that its channel faces laterally outwardly with respect to the connected male housing 34. The weld lines 40 extend along housing 34 for a substantial distance in the front-rear directional mode. In addition, there is a weld 41 across the end of cord 24.

As best seen in FIGS. 4 and 5, another channel-shaped cord 42 is welded to the opposite side of the housing 34 from cord 24. Cord 42 forms a part of another truss, which is a mirror image of the truss shown in FIG. 3, and which further includes lower cord 44 and interconnecting struts (not shown). Thus, the housing 34 of the upper male lock assembly 20 is sandwiched between the upper cords 24 and 42 of two adjacent trusses. Similarly, housing 34' of lower male lock assembly 20' is welded between the ends of the lower cords 26 and 44 of the two adjacent trusses.

Referring now to FIGS. 3, 6 and 7, there is shown a pair of tandem female lock assemblies 22 and 22', each of which includes a female body in the form of a female housing 46 or 46', respectively. (Hereinafter, parts of the male and female lock assemblies which are more or less similarly or analogous will be designated "male" or "female" to distinguish between the parts of the two genders of assemblies, and this is not intended to imply that these parts are necessarily of a projecting or receiving type configuration.)

Female housing 46 has a front wall 48 and a rear wall 50 spaced therefrom. Thus, when the upper female housing 46 is welded between the ends of cords 24 and 42 opposite the ends which mount the upper male assembly 20, the weld lines 52 may extend a substantial distance in the front-rear directional mode. There is also a weld 53 across the end of the cord. The female housing 46' of the lower female lock assembly is likewise welded between the ends of cords 26 and 44 opposite those which mount the lower male lock assembly 20'.

Referring now to FIGS. 4 and 5, the male lock assemblies 20 and 20' will be described in greater detail, and it will be understood that all other tandem pairs of male lock assemblies on the component 10, are identical.

The front wall 36 of male housing 34 has a thickened portion 54 which serves as the male socket means and has rear and front walls 54a and 54b, respectively. Male socket means defines a rectangular male socket opening 56 extending therethrough in the front-rear directional mode. (As used herein, the "front-rear directional mode" will generally refer to a position or direction of orientation parallel to front-to-rear and rear-to-front directions). As shown in FIG. 5, the transverse horizontal dimension of male socket opening 56 is substantially greater than its transverse vertical dimension.

Figure 10:
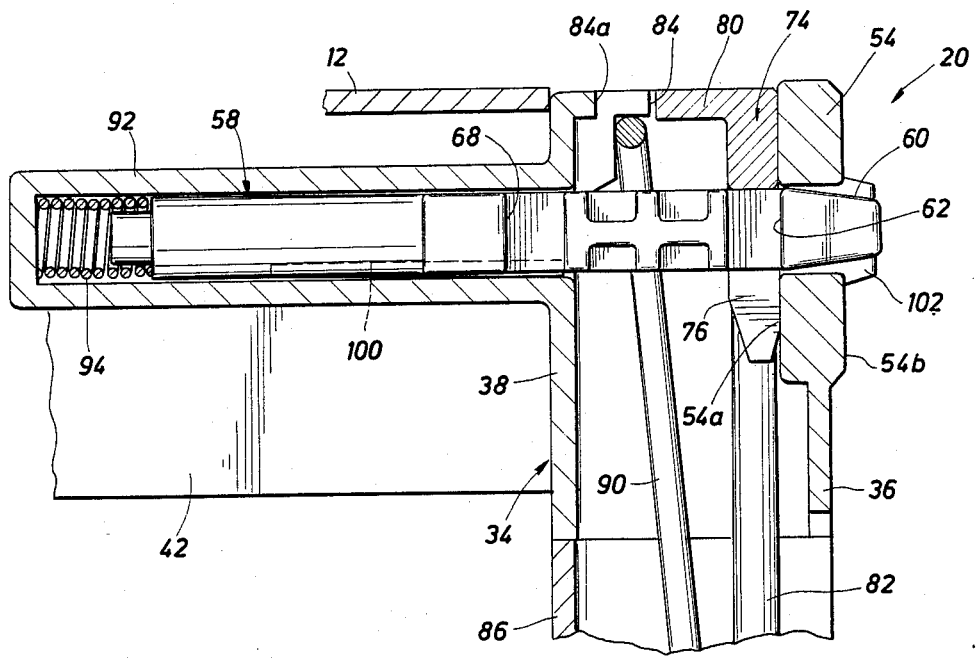
FIG. 10 is an enlarged detailed side view, in cross section, of one of the male lock assemblies with the pin member thereof locked in its retracted position.

The male lock assembly 20 further includes a monolithic cast metallic pin member 58 which is slidably received in opening 56 for reciprocation, in the front-rear directional mode, between an advanced position, as shown in FIG. 4, and a retracted position, as shown in FIG. 10. The portion of pin member 58 which is received in opening 56 is generally of a complementary rectangular cross-sectional configuration, of greater horizontal dimension than vertical dimension.

Comparing FIGS. 4, 5, 9 and 10, the outermost of head end of pin member 58 is tapered, as shown at 60, to a somewhat smaller rectangular cross section. Head end 60 has a notch 61 in its upper surface. At the juncture of head end 60 and the larger rectangular portion 64 of pin member 58, there is a first lock engagement region or necked down area including a pair of grooves 62 extending vertically along opposite sides of pin member 58 and opening laterally outwardly. Rearward of grooves 62 is the relatively large rectangular portion 64 of pin member 58, forward or rear portions of which are disposed in opening 56, depending upon whether pin member 58 is in its retracted or advanced position.

Portion 64 of pin member 58 has recesses 66 in its upper and lower surfaces, for a purpose to be described hereinafter. Recesses 66 are not sufficiently large to unduly detract from the load bearing capabilities of portion 64 of pin member 58.

At the rear extremity of large rectangular portion 64 of pin member 58, there is a second lock engagement region or necked down area including vertical grooves 68 substantially identical to grooves 62. Rearward of grooves 68 is a small tapered section 70, which in turn adjoins the cylindrical tail end 72 of the pin member 58. It should be noted that the diameter of tail end 72 does not exceed the vertical dimension of rectangular portion 64 of pin member 58.

Male lock assembly 20 further comprises lock means in the form of a plate-like lock member 74. The male lock member 74 is substantially identical to the female lock member 116 of female lock assembly 22, to be described more fully hereinbelow. Thus, comparison of FIGS. 4 and 5, which show male lock member 74 in its lower or locking position, with FIGS. 6 and 7, which show the identical female lock member 116 in its upper or release position, may facilitate understanding of both male and female lock members.

More particularly, lock member 74 is generally in the form of an inverted U, having downwardly extending tines or rails 76 sized to slidably fit in respective locking grooves 68, or alternatively, in respective locking grooves 62. Rails 76 are joined at their upper ends by a bridge section 78. A tab 80 extends rearwardly from the upper end of bridge section 78.

Lock member 74 is disposed just rearwardly of male socket means 54 in sliding abutment with the rear face 54a thereof. An opening 84 in the upper wall 35 of male housing 34 allows lock member 74 to be raised from the locking position shown in FIG. 4, wherein rails 76 are disposed in one or the other of the two pair of locking grooves 62 or 68, to a raised release position, wherein the locking member 74 clears the pin member 58. For this purpose, a suitable tool such as a crowbar, can be inserted in a notch 84a in opening 84 and engaged under tab 80.

The lower male lock assembly 20' of the tandem pair has a male housing 34' which is a mirror image of housing 34 across a horizontal plane. Assembly 20' further includes a pin member 58' which is identical to the pin member 58 of the upper male lock assembly 20 and oriented in the same manner. Because the pin members 58 and 58' are identical, and because their locking grooves, e.g. 62 and 68, extend completely therethrough in the vertical direction, it is possible for the lock member 75 of lower male lock assembly 20' to be oriented in the same manner as the lock member 74 of upper male lock assembly 20, i.e. with its bridge section uppermost and its rails or tines extending downwardly therefrom. Lock member 75 is identical to lock member 74, except that it lacks the tab 80 and its rail 77 are longer.

The two lock members 74 and 74' are connected for joint reciprocation between their locking positions and release positions by lock extension means in the form of rods 82 welded to the laterally outer sides of the two male lock members. The lower end of the housing 34 of the upper male lock assembly, and the identical upper end of the housing 34' of the lower male lock assembly are open to permit the necessary movements of rods 82. These open ends of housings 34 and 34' are further rigidly interconnected by body extension means in the form of a channel member 86, as by welding. Guides 73 are welded to housing 34' for cooperation with the rear surface of lower male lock member 75.

A male lock retainer, which is substantially identical to the device 61, 62, 63, 64 shown in prior U.S. Pat. No. 3,805,721, is provided. Briefly, the device includes a base plate 87 which is welded between the sides of channel 86 in a position to slidably engage the front surfaces of rod 82. A nut and bolt assembly 89 connects plate 87 to a spring 88 which is thereby clamped against the rear surfaces of rods 82 to frictionally engage the rods, and thereby, indirectly frictionally engage the lock members 74 and 75. The force with which the device 87, 88, 89 frictionally engages rods 82 is generally sufficient to prevent separation of the lock members 74 and 75 from their respective lock assemblies. In addition, positive stop bars 91 are welded between rods 82, for abutment with blocks 93 carried on plate 87, to positively limit vertical movement and prevent such separation. In addition, the friction device 87, 88, 89 urges the lock members 74 and 75 forwardly against their respective sockets 54 and 54'. Finally, friction device 87, 88, 89 will temporarily maintain the tandem lock member 74 and 75 in any position in which they are placed, and in particular, if they are raised, will temporarily maintain them in a raised position against the force of gravity. Nevertheless, the force with which the friction device engages rods 82 is not so great as to interfere with selective manual raising or lowering of the lock members, with simple tools such as crowbars and hammers, when desired.

To more securely hold the male lock members 74 and 75 in their lowered or locking positions, an inverted-U-shaped latch spring 90 is mounted on rods 82. Spring 90 is substantially identical in structure and function to that of prior U.S. Pat. No. 3,805,721, and thus, will not be described in great detail herein. Briefly, spring 90 is biased rearwardly so that, when the locking members 74 and 75 are in their locking positions, as shown in FIG. 4, the upper end of spring 90 is disposed beneath the upper wall 35 of housing 34 just adjacent opening 84. When it is desired to raise the lock members 74 and 75, a tool can be inserted in notch 84a to pry spring 90 forward so that the lock members can be raised. Then, whenever the lock members are again lowered to their locking positions, spring 90 will automatically snap back into a latching position under the upper wall of housing 34.

The rear wall 38 of housing 34 has a pocket 92 extending rearwardly therefrom for sliding receipt of the tail end 72 of pin member 58. A helical compression spring 94 is interposed between the bottom of pocket 92 and a shoulder 96 on the tail end 72 of pin member 58 to bias pin member 58 forward. To retain pin member 58 from being ejected through socket opening 56 or falling out from that opening when the lock member 74 is raised to its release position, a pin retainer in the form of spring 98 is carried on the underside of pin member 58. Spring 98 extends generally longitudinally along pin member 58. Its rear end is anchored on pin member 58, while its forward end if free and biased outwardly away from pin member 58. However, spring 98 can be biased inwardly so that it fits into a groove 100 (see FIG. 9) in the underside of pin member 58.

Thus, in assembling the male lock assembly 20, spring 94 can be inserted through socket opening 56 and into pocket 92. Pin member 58 is then inserted through socket opening 56, such insertion being permitted by the fact that the vertical dimension of pin member 58 nowhere exceed that which might pass through socket opening 56. As the pin member 58 is being inserted into housing 34 through socket opening 56, spring 98 is cammed inwardly by the lower surface of opening 56 into groove 100. Once groove 100 passes completely through socket opening 56, the forward end of spring 98 will spring outwardly and abut the rear face 54a of socket means 54, thereby preventing pin member 58 from falling back out of opening 56. Abutment of spring 98 with rear face 54a of socket means 54 also limits forward movement of pin member 58 under influence of spring 94 to a proper advanced position wherein grooves 68 are positioned for engagement by rails 76 of locking member 74. If it is necessary to disassemble the lock assembly, a suitable tool can be inserted through opening 84 to force spring 98 upwardly into groove 100 until pin member 58 has been advanced sufficiently for spring 98 to be held in its groove 100 by the lower surface of socket opening 56.

The rear wall 38' of housing 34' of lower male lock assembly 20' has a pocket 92' identical to pocket 92. As previously mentioned, the pin members 58 and 58' of the upper and lower male lock asemblies are identical, and the pin member 58' of the lower male lock assembly 20' has associated therewith springs identical, both in form and in interrelation with other parts of the lock assembly, to springs 94 and 98. Thus, these springs in the lower male lock assembly 20' will not be shown or further described in detail.

The front wall 36 of housing 34 has a pair of shear bearing lugs 102 formed thereon. Lugs 102 are disposed on opposite sides of socket opening 56. Lugs 102 project forwardly from the remainder of front face 54b of socket means 54, but by a distance sufficiently small that they will not interfere with the handling of the construction component 10 on which the lock assembly is carried in the manner of a standard freight container. The upper and lower surfaces 101 of each lug 102 are planar surfaces extending generally horizontally but slightly vertically inclined toward each other for a purpose to be described more fully hereinbelow. Housing 34' of lower male lock assembly 20' has identical lugs 102' thereon.

Referring now to FIGS. 6 and 7, upper female lock assembly 22 will be described in greater detail. The housing 46 of upper female lock assembly 22 is similar to the housing 34 of upper male lock assembly 20 in many respects. Its front wall 48 includes a female socket means 104 having rear face 104a and front face 104b. A female socket opening 106, substantially identical in size and shape to opening 56 of male lock assembly 20, extends through socket means 104 in the front-rear directional mode.

Front wall 48 of housing 46 differs from front wall 36 of housing 34 in that, rather than the lugs 102, wall 48 has a pair of lugs 108 formed thereon and disposed immediately above and below socket opening 106. For convenience, lugs 108 extend completely laterally across the socket means 104. However, since the purpose of lugs 108 is to engage lugs 102 when the male and female lock assemblies are mated, each lug 108 could be replaced by a pair of lugs spaced apart by a distance corresponding to socket opening 106. Lugs 108 define therebetween a space 110 for receipt of lugs 102. The planar surfaces of lugs 108 which define space 110 are slightly vertically inclined to correspond to the taper 101 of lugs 102.

The rear wall 50 of housing 46 is similar to the rear wall 38 of housing 34 of upper male lock assembly 20 except that it lacks the integral pocket 92. The upper wall of housing 46 is similar to that of the male housing 34, and in particular, includes an opening 112 identical to opening 84 and including a notch 112a identical to notch 84a. The bottom of housing 46 is identical to that of housing 34, and in particular, is open and is connected by a channel member 114 to the upper end of housing 46' of the lower female lock assembly 22'.

A female lock member 116, identical to male lock member 74, is mounted for reciprocation with respect to socket means 104 and its socket opening 106 between a raised release position as shown and a locking position in which the rails 118 of locking member 116 are disposed generally on opposite sides of opening 106 and overlapping therewith. In addition to the rails or tines 118, locking member 116 includes a bridge section 120 connecting the upper ends of rails 118, and a tab 122 extending rearwardly therefrom. The structure of member 116 is identical to that of male lock member 74, and the relationships between the member 116 in its locking and release positions, with respect to opening 106, are precisely the same as the analogous positions of members 74 with respect to opening 56.

Locking member 116 is likewise connected to a similar locking member 117 of the lower female lock assembly 22' by rods 124, by welding, for joint reciprocation between locking and release positions. The assembly 116, 124, 117 is identical to the assembly 74, 82, 75 of the tandem male lock assemblies 20 and 20'. Likewise, a frictional retaining device 125, 126, 127 identical to device 87, 88, 89 is provided for assembly 116, 124, 117, as are stops 129, 131 and a latch spring 128, identical to stops 91, 93 and spring 90, both in structure and function.

As with the tandem male lock assemblies, the tandem female lock assemblies shown in FIGS. 6 and 7 differ in that their housings 46 and 46' are reversed or arranged as mirror images of each other, while their respective locking members 116 and 117 are oriented in the same direction, i.e. with their tines extending downwardly. Likewise, locking member 117 of the lower female lock assembly has longer tines 119 but lacks a tab analogous to tab 122 of member 116. Otherwise, the female lock assemblies are identical, and in particular, it is noted that shear bearing lugs 108', identical to lugs 108, are formed on front wall 46', and guides 109 are provided for lower female lock member 117.

The operation of the male and female lock assemblies is as follows. For transport to the construction site, the pin members of the male lock assemblies would be placed in their retracted positions. FIG. 10 shows the pin member 58 of upper lock assembly 20 in its retracted position, and the retracted position of the pin member 58' of the lower male lock assembly would be analogous. As shown in FIG. 10, pin member 58 has been forced rearwardly, compressing spring 94, until the grooves 62 of its first lock engagement region are disposed behind the rear face 54a of socket 54 where they are engaged by respective rails 76 of locking member 74, which has been lowered to its locking position.

As will be explained more fully below in connection with the advanced position of the pin 58, rails 76 are sized to project laterally outwardly from grooves 62 beyond the sides of opening 56 so that they may abut the rear face 54a of socket 54. Thus, the rear-to-front force exerted on pin member 58 by compressed spring 94, or any other rear-to-front force which might be exerted on pin member 58, is transmitted through locking member 74 to socket 54, whereby pin member 58 is prevented from advancing from the position shown in FIG. 10. Although further retraction of pin 58 rearwardly from the position of FIG. 10 is not a particular problem, it might be noted that such movement will be limited by abutment of tab 80 of lock member 74 with the edge of opening 84 in housing 34 and abutment of lock member 75 with guides 73.

The locking member 74 is latched into its lowered or locking position, as shown, by virtue of the fact that spring 90 underlies the top wall 35 of housing 34 adjacent opening 84. It should be noted that, when the lock member 74 is in its locking position, it lies generally flush with the upper extremity of housing 34, which in turn is generally flush with the top wall 12 of the construction component 10 (shown in FIG. 10 but broken away in other Figs. for clarity). The head end of pin member 58 projects forwardly from the front face 54b of socket 54 only by a very small distance, generally comparable to that by which the lugs 102 project. As previously mentioned, this distance is not great enough to interfere with transport and other handling of the construction component 10 in the manner of a standard freight container. Thus, with the apparatus in the position of FIG. 10, it will be said that all parts of the male lock assembly lie generally within the gross dimensions of the construction component 10. The pin member 58' will be held in a similar retracted position by its respective locking member 75, as will all other pin members of all male lock assemblies on the construction component.

When the component 10, and similar components to be connected thereto, have reached the construction site, the pin members of those male lock assemblies which will be used to make up the connections between the construction components will be placed in their advanced positions, as shown in FIG. 4, and the locking members of the female lock assemblies to be connected therewith will be raised to their release positions as shown in FIGS. 6 and 7.

More specifically, with respect to the male lock assemblies, and beginning from the position of FIG. 10, a crowbar or other suitable tool is inserted into notch 84a in opening 84 in the top wall 35 of housing 34 of the upper male lock assembly 20. In a manner more fully explained in the aforementioned prior U.S. patents, the tool is used to force the upper end of spring 90 forward, until it clears the underside of the top housing wall and is forced under tab 80. By continued movement of the tool, tab 80 can be pryed upwardly, thereby raising locking member 74 and the connected locking member 75 of the lower male lock assembly 20'. Continued upward movement may be effected, either with the same or another tool, or by hand, once the upward movement has been started in the aforementioned manner.

When the locking members 74 and 75 have been raised a sufficient distance to clear their respective pin members 58 and 58', i.e. to their release positions (which are analogous to those shown in FIGS. 6 and 7 for the female lock assemblies) pin member 58 will be urged outwardly by spring 94, and pin member 58' will likewise be urged outwardly by a similar compression spring (not shown) in pocket 92'. If, for any reason, e.g. breakage of such compression springs, the pins 58 and 58' do not advance from their retracted positions, a simple tool can be engaged in notch 61, or in any of the recesses 66, depending on the current position of the pin member, to force the pin member outwardly or forwardly to its advanced position. Since housing 34' is identical to housing 34, and in particular, has an opening (not shown) in its lower wall identical to opening 84 in the upper wall of housing 34, a similar technique may be used to force pin 58' outwardly or forwardly.

As the portion of pin 58 which, in its retracted position, is disposed in pocket 92, moves forwardly, spring 98 will automatically emerge from its groove 100 in the underside of pin member 58. Spring will engage rear face 54a of socket 54 when the pin member 58 is in its advanced position, i.e. with grooves 62 located well beyond front face 54b of socket 54 and with grooves 68 located just behind rear face 54a, under influence of spring 94. Although spring 98 would not be sufficient to take high tensile loading, it will stop the movement of pin member 58 in the forward direction under the relatively low force exerted by spring 94, and temporarily hold the pin member 58 in that position until lock member 74 can be lowered to its locking position, as shown in FIG. 4. Pin member 58' has an identical spring (not shown) which similarly stops the forward movement of pin member 58' at its advanced position.

When locking member 74 is lowered, as by striking it with a hammer, the connected locking member 75 will automatically be lowered therewith. Rails 76 of locking member 74 will enter grooves 68, and rails 77 of locking member 75 will enter analogous grooves in lower pin member 58'. Since locking member 74 is sandwiched between rear face 54a of socket 54 and the edge of upper housing wall 35 adjacent opening 84, and lock member 75 is sandwiched between socket 54' and guides 73, this position locks the pin members in their advanced positions. The locking rails 76 or 77 of each pair have their inner sides flared outwardly and downwardly, as explained in the aforementioned prior U.S. patents (see also 118a and 119a in FIG. 7), to tighten the locking engagement gradually. Also, as shown in FIG. 4, for example, the lower end of each rail 76 has its front and rear surfaces tapered inwardly and downwardly to guide the rails into the locking grooves. During the aforementioned lowering of the assembly 74, 82, 75, spring 90 will snap into place beneath the upper wall of housing 34 adjacent opening 84.

The locking members 116 and 117 of the tandem female lock assemblies 22 and 22' will be raised to their release positions, as shown in FIGS. 6 and 7, in the same manner as was done with the male lock assemblies. Then, with the male lock assemblies in the positions shown in FIGS. 4 and 5, and the female lock assemblies in the positions shown in FIGS. 6 and 7, the construction components on which these assemblies are carried are drawn toward each other, as by ropes or the like, so that pin members 58 and 58' enter socket openings 106 and 106', respectively. The tapered areas 60 on the head end of pin member 58 help to gradually guide the pin member into the female socket opening 106. Because the lugs 108 extend completely across the front face of female housing 46, and in particular, across the upper and lower borders of socket opening 106, tapered areas 110 likewise help to gradually guide pin member 58 into socket opening 106. The same type action occurs in the lower lock assemblies 20' and 22'.

When the assemblies have been thus mated, the grooves 62 of the first lock engagement region of pin 58 will be disposed just behind rear face 104a of socket 104 of the mating female lock assembly. Analogous grooves of pin member 58' will be in a like position with respect to lower female lock assembly 22'. By striking the locking member 116 of the upper female lock assembly 22, both locking members 116 and 117 are lowered to their locking positions, to place the apparatus in the condition illustrated in FIGS. 8 and 9.

It is specifically noted that, as the assembly 116, 124, 117 is being lowered, long rails 119 of the lower female lock member 117 will begin to engage their respective pin member 58' before rails 118 of upper female lock member 116 engage pin 58. Because of the downward and outward flaring of the laterally inner edges 119a of rails 119 (see FIG. 7), and the downward and inward tapering of the front and rear surfaces of the rails 119 at their lower ends (see 119b in FIG. 6), the lower lock assemblies 20' and 22' will be gradually cammed or wedged into firm mating engagement by the lowering of lock member 117. This will overcome any tendency of the lower edges of the lateral walls on which the lock assemblies are carried to splay (as the weight of the workers standing near those lateral walls on the upper deck tips or rocks the respective construction components). Thereafter, the upper lock member 116 may readily be fully lowered and engaged with its respective pin member. It is noted, in particular, that if the upper female lock member 116 were permitted to engage its respective pin member too soon, it could provide a pivot point which would increase the tendency of the lower edges of the lateral walls of the two construction components to splay thereby making it difficult to properly mate and lock the lower assemblies.

Figure 8:
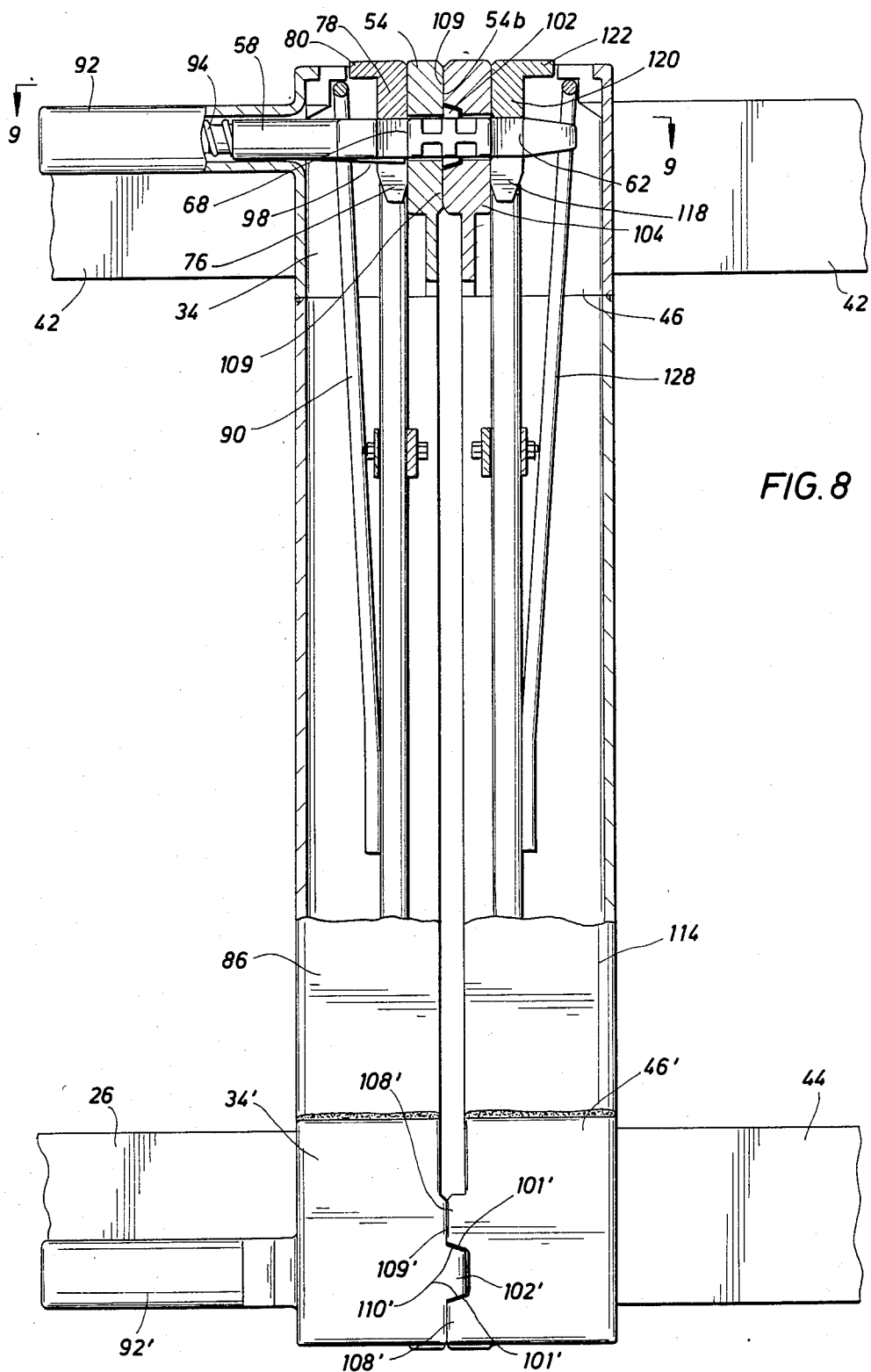
FIG. 8 is a side view, partly in cross section and partly in elevation, showing the tandem lock assemblies of FIGS. 4 and 6 in mated and locked condition.
Figure 9:
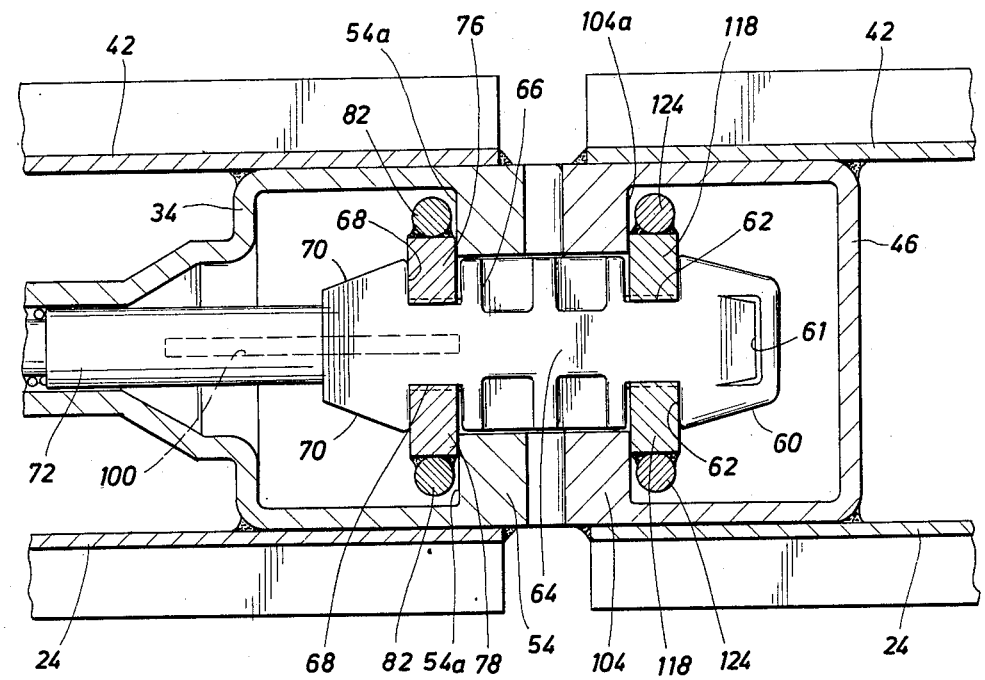
FIG. 9 is an enlarged detailed view, taken along the line 9—9 of FIG. 8.

With the apparatus in the condition illustrated in FIGS. 8 and 9, because rails 118 of upper female locking member 116 are disposed in grooves 62 of pin member 58, but extend laterally outwardly therefrom to abut rear face 104a of female socket 104, any front-to-rear force exerted on pin member 58 will be transmitted through locking member 118 to socket 104, whereby pin member 58 is locked into female lock assembly 22.

If a rear-to-front tensile force is exerted on pin member 58, e.g. if the construction component on which the female lock assembly 22 is carried tends to pull away from the construction component on which the male assembly 20 is carried, such force will be transmitted from the rear face 104a of socket 104 through locking member 118 to pin member 58, and from pin member 58 through male locking member 74, to male socket 54.

When the male and female lock assemblies have been mated and locked together, the shear bearing lugs 102 and 108 of the male and female lock assemblies, respectively, are meshed. Because the shear bearing formations 102 and 108 project and receive in a generally front-rear directional mode with respect to pin member 58, they are capable of transmitting shear forces transverse to pin member 58 independently of that pin member. In particular, the upwardly and downwardly facing surfaces of lugs 102, and the opposed surfaces of lugs 108, while tapered or vertically inclined to help guide the lock assemblies into proper engagement and to ensure, through a wedging action, contact between the male and female shear bearing formations, face generally vertically, and therefore, are capable of transmitting vertical shear loads between the housing 34 and 46 independently of pin member 58.

This arrangement is chosen, especially for components to be used in constructing floating structures such as barges, because the vertical shear forces tend to be greater than the transverse horizontal shear forces. However, it will be appreciated that the principles of the present invention can likewise be applied to provide shear bearing formations which would transmit horizontal shear forces independently of the pin member. In general, it is desirable that the shear bearing formations be arranged so as to transmit shear loads transverse to the pin member in a direction generally parallel to the path of reciprocation of the locking means, thus they should face generally in such direction.

Returning to the exemplary embodiment illustrated, wherein the shear bearing formations are arranged to transmit vertical shear loads, it can be seen, most notably in FIG. 5, that the transverse vertical dimension of pin member 58 can be substantially smaller than its transverse horizontal dimension, since pin member 58 is relied upon to transmit only horizontal shear loads (which are usually relatively low in the types of construction in question). Thus, a given locking system, comprising a male and female lock assembly, is capable of handling generally greater loads than were previously possible, without a corresponding increase in the overall size and weight of the pin members. Furthermore, by minimizing the vertical thickness of pins 58 and 58', it is possible to maximize the distance between their centers of gravity, and thereby better resist hinging action of the connected components on a horizontal axis.

Because of the use of tandem pairs of lock assemblies, the assemblies of each pair being vertically spaced, and further due to the use of pin members which are formed (preferably monolithically) of metal or like rigid material throughout, the locking system of the present invention is defined to positively prevent any substantial hinging, about a horizontal axis, as between adjacent connection components. This enables such components to be assembled into many types of structures which could not be properly formed with the articulated types of connections exemplified by certain prior art systems described hereinabove. Not only is it possible, with the present invention, to form more stable floating structures, such as bridges, drilling platforms, etc., but it is also possible to form non-floating structures such as land supported bridges and the like. Nevertheless, and again due to the rigidity of the pin members and their arrangement in vertical tandem pairs, it is not necessary to use unduly large force-transmitting parts in the lock assemblies, and in particular, all moving parts of the lock assemblies, including the pin members and the male and female lock means, are easily manually movable using simple hand tools. The planar configuration of the meshed shear bearing surfaces 101 and 110 further resists any such hinging action.

Another feature which enhances the load handling characteristics of the apparatus is the fact that each of the housings 34 and 46 is integral—preferably monolithic—and has a substantial front-to-rear dimension, i.e. includes a front wall which defines the respective socket means and a rear wall spaced from that front wall. Referring again to FIG. 3, it will be recalled that the weld lines 40 and 52 extend along a substantial front-rear extent of the respective housings 34 and 46. This differs from prior art arrangements in which a single plate-like socket (for a female assembly) or pin base (for a male assembly) was welded to the construction component. The new arrangement provides a better force distribution, and in particular, provides a welded attachment at a position spaced from the socket means, where substantial forces are felt, thereby lessening the chance of failure of one type or another.

All of the above force transmitting interrelationships in the upper assemblies 20 and 22 are duplicated in the analogous parts of the lower assemblies 20' and 22', so that the latter will not be further described in detail. However, it is noted that in FIG. 8, the meshing relationship between the shear bearing lugs 102' and 108' is further illustrated in elevation.

If it is desired to separate the construction components which have been thus connected together, the upper female lock member 116 is raised to its release position, carrying the lower female lock member 117 with it via rods 124. The construction components can then be separated. To provide low profiles for any additional transport or handling of the components, the female lock members can then be relowered into their locking positions, but without any pin members disposed in their respective sockets.

To return the male lock assemblies to a low profile position, the upper male lock member 74 is first raised to its release position, carrying the lower member 75 therewith. Lower pin member 58' of the tandem pair of male lock assemblies is pushed rearwardly or inwardly to its retracted position and temporarily held there manually or by any suitable means. The interconnected lock members 74 and 75 are partially lowered, by striking the upper member 74. Because the rails 77 of lower male lock member 75 are longer than the rails 76 of upper male lock member 74, rails 77 will engage partially within grooves 62' of their respective pin member 58' while rails 76 of upper lock member 74 are still clear of their respective pin member 58. This will temporarily hold pin member 58' in its retracted position while pin member 58 is urged rearwardly to its retracted position. Then, while temporarily holding pin 58 in its retracted position, e.g. manually, the lock members 74 and 75 are further lowered to their full locking positions, wherein both pin members 58 and 58' are firmly locked in their retracted positions, and the locking assemblies 74, 82, 75 in turn is latched in place by engagement of spring 90 with the underside of the top wall of housing 34.

The foregoing describes exemplary embodiments of the present invention. However, many modifications can be made within the skill of the art and the spirit of the invention. It is therefore intended that the scope of the invention be limited only by the claims which follow.

What is claimed is:

1. A construction component comprising:
   a plurality of male lock assemblies arranged in pairs, the two male lock assemblies of each of said pairs being vertically spaced from each other along a lateral wall of said component, and each of said male lock assemblies comprising:
   a male body fixedly mounted on said component;
   a rigid pin member carried by said male body for reciprocation between an advanced position in which said pin member protrudes from said lateral wall of said construction component and a retracted position in which said pin member lies generally within the gross dimension of said construction component;
   resilient biasing means cooperative between said male body and said pin member, to yieldably bias said pin member to said advanced position;
   and male lock means carried on said male body and cooperative with said pin member, when said pin member is in its retracted position, to selectively prevent movement of said pin member to its advanced position;
   and a plurality of female lock assemblies adapted for engagement with such male lock assemblies of a similar construction component for locking the components together, said female lock assemblies being arranged in pairs, the two female lock assemblies of each of said pairs being vertically spaced from each other along a lateral wall of said component, and each of said female lock assemblies comprising a female body including female socket means defining a female socket opening adapted for receipt of such a pin member, and female lock means movable with respect to said female socket means between a release position and a locking position for selectively locking such pin member in said female socket means.

2. The apparatus of claim 1 wherein said construction component is generally in the form of a rectangular parallelepiped having gross dimensions generally corresponding to those of a standard freight container.

3. The apparatus of claim 2 wherein said construction component further has standard container lift-lash fittings thereon.

4. The apparatus of claim 3 wherein said pin members and said lock means are manually movable between their respective positions.

5. The apparatus of claim 1 wherein there are an even number of such pairs on each lateral side of said construction component, the lock assemblies on each such side being alternately male and female along the length of said side.

6. The apparatus of claim 5 wherein such construction component comprises outer walls and a plurality of load bearing trusses extending across the interior thereof, and wherein each of said trusses has a male lock assembly mounted on one end thereof and a female lock assembly mounted on the other end thereof.

7. The apparatus of claim 1 wherein as to each of said male lock assemblies:
said male body including male socket means having front and rear faces and a male socket opening extending therethrough in the front-rear directional mode and receiving said pin member for such reciprocation;
said male lock means is carried by said male body for reciprocation with respect to said male socket means and transverse to said male socket opening between a locking position, for interengagement between said male body and said pin member for transferring rear-to-front forces from said pin member to said body, and a release position spaced therefrom;
and wherein said pin member has first and second lock engagement regions spaced from each other along the length of said pin member such that, when said pin member is in its advanced position, said first lock engagement region is positioned forward of said front face of said male socket means for insertion into a female socket opening and for engagement by a female lock means of another such construction component, and said second lock engagement region is positioned for engagement by said male lock means, said male lock means, in its locking position, being cooperative between said pin member and said male body to so transfer rear-to-front forces and prevent forward movement of said pin member with respect to said male socket means beyond its advanced position.

8. The apparatus of claim 7 wherein, when said pin member is in its advanced position and said male lock means is in its locking position, said male lock means is further cooperative between said pin member and said male body to inhibit movement of said pin member to its retracted position.

9. The apparatus of claim 8 wherein, when said pin member is in its retracted position, said first lock engagement region is positioned for engagement by said male lock means, and said male lock means, in its locking position, is cooperative between said pin member and said male body to prevent movement of said pin member to its advanced position.

10. The apparatus of claim 7 further comprising male lock retainer means cooperative between said male body and said male lock means to prevent separation thereof, and female lock retainer means cooperative between said female body and said female lock means to prevent separation thereof.

11. The apparatus of claim 7 wherein said male and female lock means are vertically movable, being lowered in said locking position and raised in said release position, and wherein said male and female lock retainer means include means operative to retain their respective lock means in raised positions against the force of gravity.

12. The apparatus of claim 11 wherein said male and female lock retainer means include resiliently biased friction devices engaging their respective lock means with forces of such magnitude that said forces can be overcome to manually lift said lock means but will then automatically retain said lock means in a raised position, against the force of gravity, when the manual lifting force is removed.

13. The apparatus of claim 7 wherein said male and female lock means are similar.

14. The apparatus of claim 13 wherein each of said pin members has, in each of its lock engaging regions, a pair of parallel locking grooves extending generally vertically along opposite sides of said pin member; and wherein each of said male and female lock means comprises a pair of generally vertically oriented locking rails disposed behind the rear face of the respective male or female socket means, each of said rails being slidably receivable in a respective locking groove of such pair of grooves and extending laterally outwardly from said groove beyond the respective socket opening whereby said rails may abut the rear face of the respective socket means adjacent the respective socket opening to transfer longitudinal forces on said pin member to said socket means.

15. The apparatus of claim 14 wherein each of said lock means, in its locking position, lies generally within the gross dimensions of said construction component.

16. The apparatus of claim 15 wherein the socket means of each pair of lock assemblies are structurally interconnected, and the lock means of each pair of lock assemblies are connected for joint reciprocation.

17. The apparatus of claim 16 wherein, as to each such pair of lock assemblies, when the lock means are jointly removed from their release positions to their locking positions to so engage said pin members, one of the lock means of said pair will engage its respective pin member before the other lock means of said pair engages its respective pin member.

18. The apparatus of claim 17 wheren said one lock means is the lock means of the lower of said pair of lock assemblies.

19. The apparatus of claim 18 wherein said construction component is buoyant.

20. The apparatus of claim 18 wherein the locking rails of said one lock means are longer than the locking rails of said other lock means.

21. The apparatus of claim 7 wherein said male and female lock assemblies comprise respective shear bearing formations integrally adjoined to their respective socket means, said shear bearing formations projecting and receiving horizontally for interengagement when the respective lock assembly is mated with a lock assembly of the opposite gender of another such construction component, and defining respective opposed shear bearing surfaces for transmitting shear forces transverse to said pin member independently of said pin member.

22. The apparatus of claim 21 wherein said shear bearing formations are adapted to so transmit vertical shear loads.

23. The apparatus of claim 22 wherein said shear bearing surfaces are adapted to resist pivoting of such connected components about a horizontal axis.

24. The apparatus of claim 22 wherein each of said pin members, in the area adapted to be received in said male and female socket means when the pin member is in its advanced position and locked into a female socket means, has a transverse generally vertical dimension substantially smaller than its transverse generally horizontal dimension.

25. The apparatus of claim 24 wherein each of said lock assemblies comprises a housing having a front wall comprising the respective socket means and on which the respective shear bearing formations are formed, and a rear wall spaced from said front wall.

26. The apparatus of claim 25 wherein each of said housings is monolithic.

27. The apparatus of claim 26 wherein said construction component is generally in the form of a rectangular parallelepiped having gross dimensions generally corresponding to those of a standard freight container.

28. The apparatus of claim 1 wherein said construction component is buoyant.

29. The apparatus of claim 1 wherein said pin members and said lock means are manually movable between their respective positions.

30. The apparatus of claim 7 wherein the lock means of each pair of lock assemblies are connected for joint reciprocation.

31. The apparatus of claim 1 wherein each of said male lock assemblies further comprises pin retainer means cooperative between said pin member and said male body to limit movement of said pin member by force of said resilient biasing means, and thereby prevent separation of said pin member and said male body.

32. The apparatus of claim 31 wherein said pin retainer means are selectively disengageable to permit selective disassembly of said pin member from said male body.

33. The apparatus of claim 32 wherein each of said pin members has a retainer recess therein, said pin retainer means being carried on said pin member adjacent said retainer recess and resiliently biased to extend out from said retainer recess for engagement with said male body, but yieldably whereby said retainer means can be selectively forced into said retainer recess.

* * * * *